Oct. 13, 1964
G. O. GABRIEL
3,153,161
SYNCHRONOUS MOTOR
Filed May 31, 1962
4 Sheets-Sheet 1
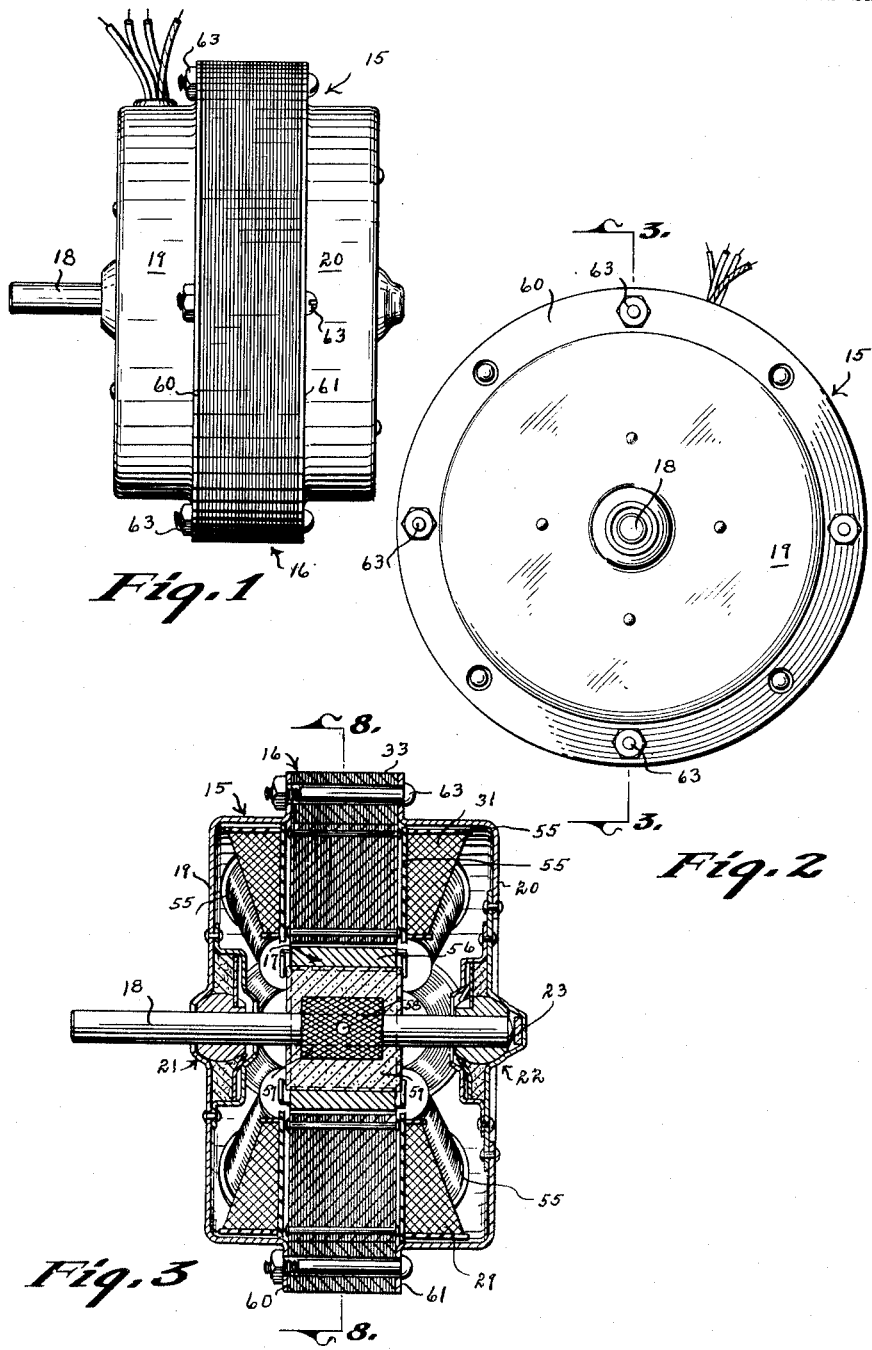
INVENTOR.
GUSTAVE O. GABRIEL
BY
Talbert Dick & Farley
ATTORNEYS
WITNESS
NORMAN G. TRAVISS Oct. 13, 1964  G. O. GABRIEL  3,153,161
SYNCHRONOUS MOTOR
Filed May 31, 1962  4 Sheets-Sheet 2
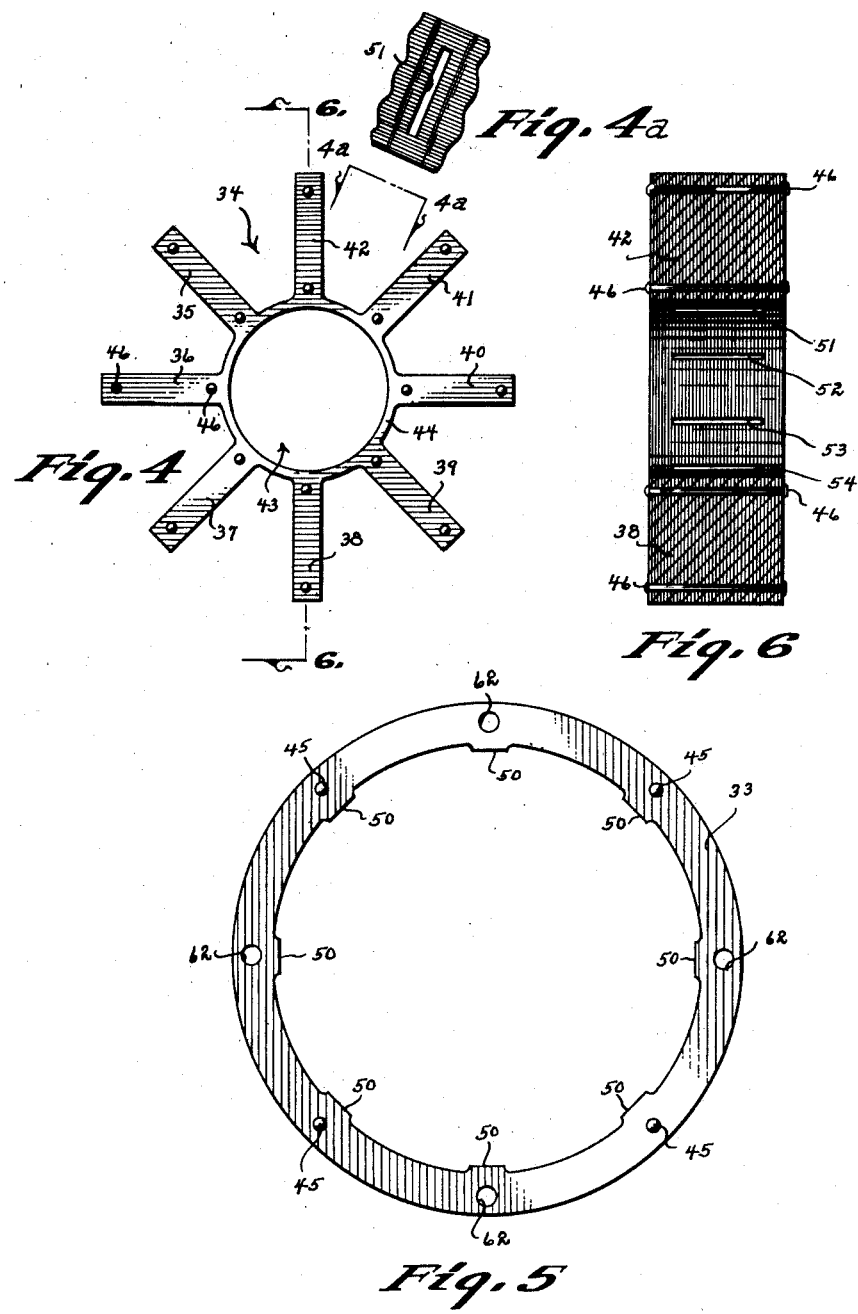
INVENTOR.
GUSTAVE O. GABRIEL
BY
Talbert Dick & Farley
ATTORNEYS
WITNESS
NORMAN G. TRAVISS Oct. 13, 1964    G. O. GABRIEL    3,153,161
SYNCHRONOUS MOTOR
Filed May 31, 1962    4 Sheets-Sheet 3

INVENTOR.
GUSTAVE O. GABRIEL
BY
Talbert Dick & Farley
ATTORNEYS

WITNESS
NORMAN G. TRAVISS

Oct. 13, 1964  G. O. GABRIEL  3,153,161
SYNCHRONOUS MOTOR

Filed May 31, 1962  4 Sheets-Sheet 4

INVENTOR.
GUSTAVE O. GABRIEL
BY
Talbert Dick & Jarley
ATTORNEYS

WITNESS
NORMAN G. TRAVISS

3,153,161
SYNCHRONOUS MOTOR
Gustave O. Gabriel, Columbus, Nebr., assignor to Dale Electronics, Inc., Columbus, Nebr., a corporation of Nebraska
Filed May 31, 1962, Ser. No. 198,858
2 Claims. (Cl. 310—162)

This application is a continuation-in-part of my copending application Serial Number 626,885 filed December 7, 1956.

The present invention relates to synchronous electric motors of the hysteresis type which are self-starting on single phase supply and which may be operated on two or three phase supply.

Fractional or sub-fractional horsepower, self-starting, electric motors of the hysteresis type are presently known in the art. However, certain disadvantages have heretofore been common to such motors, such as low starting and running torques, excessive mechanical and electrical noises, and excessive heating. Such motors have also been objectionable because of the size and space requirements for the small power developed. Cooling fans have been widely used in connection with such motors, but these are also objectionable, particularly when the motors are used for driving sound recording and reproducing apparatus such as high fidelity record players, tape recorders, and the like, because the fans produce noise which is picked up by the electronic system. Dynamic balance problems are encountered both before and after manufacture. The aforementioned motors have consequently been excessively high in manufacturing cost.

Some attempts have previously been made to overcome the above disadvantages, an exampe being the construction disclosed by my United States Patent No. 2,871,384, issued January 27, 1959, entitled "Stator Construction for Synchronous Hysteresis Motors." The stator is formed from a laminated structure of die stamped metal pieces comprising an outer ring pressed or shrunk onto a spider or spoke construction which carries the coils. Some of the spokes are joined at one end by a relatively thin circular web, the inside of which forms the rotor bore, while others are merely rectangular in form and independent from physical association with the other spokes. The circular web or rotor bore therefore has gaps or spaces around its periphery where the single spokes are placed between those which are joined by the web.

The stator of the present invention is also formed of an outer ring shrunk or pressed on a spider. The structure may be formed of thin, die stamped pieces in a laminated structure, as in the illustrated embodiment, but not necessarily so. The spokes of the spider portion are differently oriented with respect to the rivets or screws in the outer ring with resulting improvements in the magnetic field, as will be more fully explained hereinafter. If formed of a laminated structure, as shown, the die stamped pieces are all identical, thus eliminating the necessity of interleafing independent spokes with those joined by the central web as in the embodiment disclosed in my aforementioned patent. Further improvements in the magnetic field, with resulting improvements in starting and running torque, electrical power requirements, efficiency and coolness of operation, etc., are realized by removing portions of the central web of rotor bore from the spaces between the spokes. These and other advantages will be more fully explained and will become apparent by reference to the following detailed disclosure and accompanying drawings.

It is a principal object of the present invention to provide a synchronous motor of the hysteresis type which is efficient, can be totally enclosed, operated without a cooling fan and still have a temperature rise at full load which is below the allowable temperature rise for motors of similar horsepower output.

Another object of the invention is to provide a motor of the above type in which all the essential parts of the frame and stator may be made by stamping and punch presses using progressive dies so that the cost of making such a motor will be materially less than the cost of making any comparable motor now on the market.

A further object of the invention is to provide a motor of the above type that may be manufactured in a wide range of fractional or sub-fractional horsepower outputs without in any way changing the coil windings, the stator structure or the physical dimensions of the rotor.

A still further object is to provide a stator for a synchronous motor of the hysteresis type which has a tight and efficient magnetic circuit and comprises a plurality of radial spokes which are connected at their inner ends by a relatively thin, circular web and a ring which is shrunk or pressed on the outer ends of the spokes, portions of the web being removed in the spaces between the spokes thereby increasing the efficiency of the motor by increasing the flux density in the air gap between the rotor and the stator bore, and by decreasing the flux density in the circular web wherein the portions have been removed.

Still another object is to provide a stator for a motor of the aforementioned type wherein the stator construction materially increases the efficiency of the magnetic circuit and decreases eddy current or rotational losses therein.

Finally, it is an object of the present invention to provide a self-starting, fractional horsepower, synchronous motor of the hysteresis type which is economical in manufacture, durable in use, compact and efficient.

Other objects will in part be obvious and will in part appear hereinafter.

Accordingly, the invention comprises the apparatus having the construction and association of parts and elements as set forth in the following detailed disclosure. For a fuller understanding of the nature and objects of the present invention reference should be had to the accompanying drawings wherein:

FIGURE 1 is a side elevational view of a fully assembled motor embodying the invention;

FIGURE 2 is an end view of the motor of FIGURE 1;

FIGURE 3 is a side view in vertical section taken on the line 3—3 of FIGURE 2;

FIGURE 4 is a plan view of a portion of the stator assembly;

FIGURE 4a is a fragmentary side view of a portion of the assembly shown in FIGURE 4;

FIGURE 5 is a plan view of the other portions of the stator assembly;

FIGURE 6 is a side sectional view taken on the line 6—6 of FIGURE 4;

Figure 7:
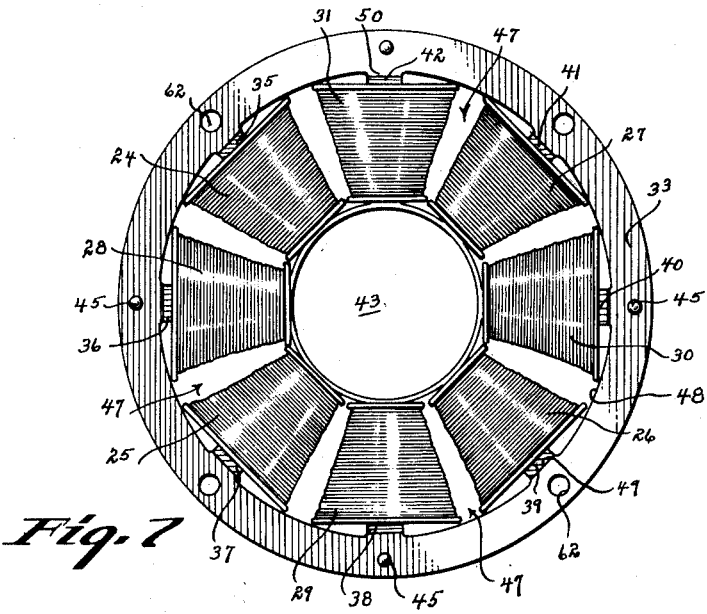
FIGURE 7 is a plan view of a complete stator assembly showing the manner of mounting the coils on the spokes thereof.

Referring now to the drawings, in FIGURES 1, 2 and 3, an assembled motor 15 embodying the invention is shown. It comprises a stator 16 provided with polyphase concentrated windings, a magnetizable rotor 17 having a shaft 18 supported on end covers or frames 19 and 20 by bearing assemblies 21 and 22. Since the particular motor illustrated is adapted for operation with the shaft in a vertical position, the bearing 22 includes a closed pocket for a pallet thrust bearing 23 on which the lower end of the shaft 18 would then rest.

Figure 9:
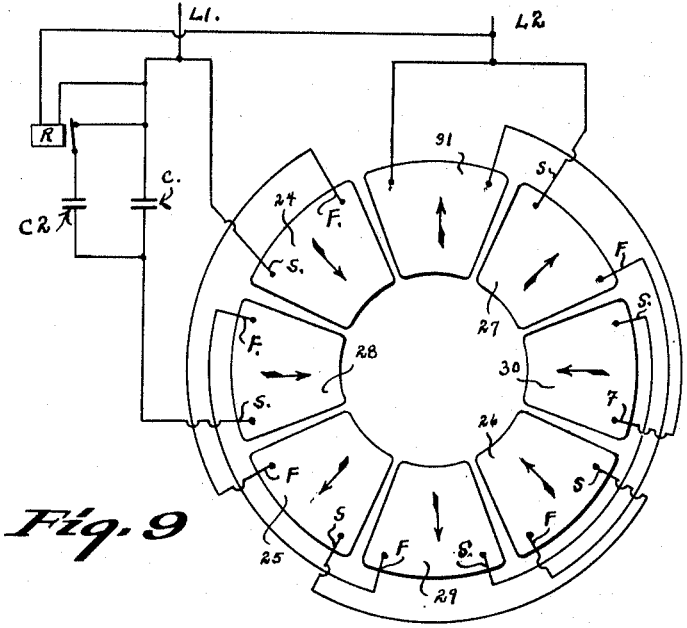
FIGURE 9 is a schematic plan view of the main and auxiliary or phase shift windings for the motor and their connection with one another, a capacitor being in circuit with the auxiliary windings.

The polyphase windings are preferably concentrated, as distinguished from distributed windings, and are wound tightly on coil winders. The windings of the phases for single phase voltage operation may be called the main and auxiliary, or capacitor, windings. The main windings comprise four coils 24, 25, 26 and 27, and the auxiliary or phase shift windings comprise four coils 28, 29, 30 and 31 in circuit with a capacitor C (FIG. 9).

The stator 16 is shown more clearly in FIGS. 4-7 inclusive. It may be machined from a single piece of suitable material, but for ease and economy of manufacture is preferably formed from a stack of relatively thin pieces of electric silicon steel, for example, which may be cut or stamped as by progressive dies. The individual pieces may be stacked and joined together to form a laminated, unitary stator.

The individual pieces or laminae of which the stator is composed are preferably punched out in a progressive die from a strip of electric steel or other suitable material. Each piece comprises an outer ring 33 and a spider 34 having a plurality of spokes or arms 35 through 42, inclusive, and a central, circular web 44. The radial width of web 44 is quite small but of such dimension that it can be made in a punch press without undue breakage of the web. In practice it has been found that a web having a radial width of about $1/32$ of an inch can be made within reasonable and satisfactory limits of breakage. In the forming of the individual stator laminae, the areas 47 (FIG. 8) and the central bore 43 are removed before the spider arms are separated from the outer ring 33. The outer edges of areas 47 are on a circle 48 whose diameter is greater than the circle 49 on which the ends of the spider arms are severed. Therefore, when the arms are severed from outer ring 33 a small, inwardly extending shoulder 50 is formed on the outer ring at each point of severance.

When the spider 34 is severed from the outer ring 33 in the die, the arms 35-42 will elongate slightly while the diameter of the circle 49 on ring 33 will decrease. Therefore, in this condition of the spider and ring portions, the ends of the arms would not fit back into the ring. However, when a stack of ring laminations have been assembled and a stack of spider laminations have been assembled, the ring may be fitted over the spokes by heating the ring to an appropriate temperature. Upon cooling the stator ring 33 will thus have a shrink or compression fit with the ends of the stator arms 35-42.

As previously stated, the individual pieces may be cut from a strip of electric silicon steel. The grain of the steel is lengthwise of the strip. Therefore, it can be seen that the direction of the grain will be lengthwise with respect to the arms at the three and nine o'clock positions and at various angles with respect to the radial directions of the other arms. In order to provide an equal distribution of radially extending grain in each of the arms of the assembled spider, each punching when assembled is rotated 45 degrees with respect to the preceding punching. The growth of the arms and shrinkage of the ring is attributable to the manner in which the material is held in the die, the thinness of the material and the fact that the radial width of web 44 is very small.

After punching and stacking the laminations in the stator outer ring 33 and spider 34 are joined together to form rigidly assembled structures. As shown, the laminations of outer ring 33 are secured by rivets 45, while the spider punchings are secured by two rivets 46 in each arm.

After the spider punchings have been joined together web 44 forms a cylinder which defines the rotor bore 43. Portions are then cut and removed from the interpole space, that is, the portion of web 44 between each pair of spoke arms 35, 36, 37, 38, 39, 40, 41 and 42 to form elongated openings. Thus in the motor shown in FIG. 8 there will be eight of these slit openings and in the motor of FIG. 10 there will be nine slit openings inasmuch as it has the extra spoke 95. The purpose and result of these slit openings will be more fully explained hereinafter.

FIG. 4a shows one of these slit openings and which I have designated by the numeral 51. In FIG. 6 I show four of these slot openings 51, 52, 53 and 54. All slots are of substantially the same open area and each communicates with the bore 43.

When the ring 33 and spider 34 have been disassembled as herebefore described, the preformed eight coils 31, 24, 28, 25, 29, 26, 30 and 31 are mounted on the arms 35, 36, 37, 38, 39, 40, 41 and 42, respectively. The ring is then heated so that it will slip freely over the ends of the arms adjacent the shoulders 50. The stator will then be assembled with the coils in place and the ring 33 shrunk onto the spider 34, as shown in FIG. 7. The general shape of the coil windings in transverse section is oval, whereas the shape in radial section is conical. The conical shape is required in order that there may be sufficient space to accommodate the inner ends of the coils when assembled on the spider. The coils are oval because of the rectangular shape of each spider arm. Each coil is wound on a spool or shield of insulating material 55 having a body of generally rectangular shape and flanges at each end which serve to insulate the ends of the coil windings from the stator. The spool may be made of any suitable material such as glass, plastic or fish paper, molded to shape, so that a coil may be wound on the spool in an automatic winding machine.

Figure 8:
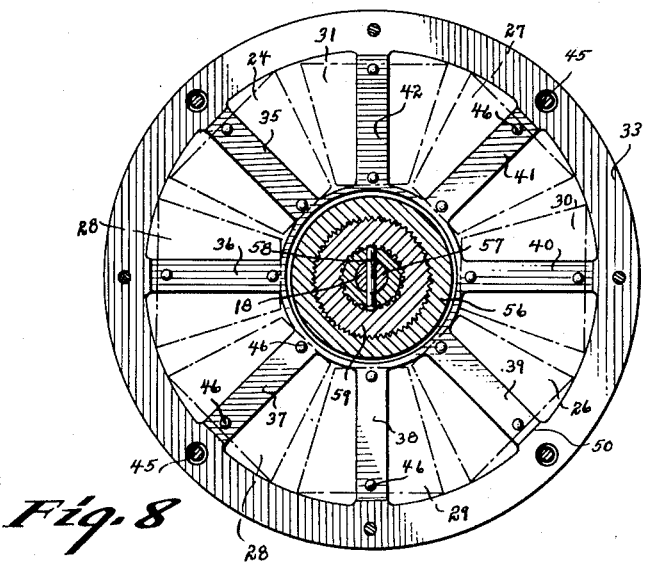
FIGURE 8 is a plan view of the interior of the motor, the coils being indicated in dot-dash lines.

As shown in FIG. 8, the rotor comprises a cylindrical member 56 of a permanent magnetic material such as an alnico alloy. The cylinder 56 is preferably cast and then heat-treated to give the desired coercive force for a given horsepower output of the motor. The rotor includes the shaft 18 to which cylinder 56 is rigidly secured by means of a knurled sleeve 57, secured by a pin 58 to shaft 18, and a plastic mass 59.

Rotor 17 is assembled in a suitable jig so that cylinder 56 will be concentric with the longitudinal axis of shaft 18. The plastic mass 59 may consist of No. 5083 Seletron-polesterine Resin manufactured by Pittsburgh Plate Glass Co., hard silica No. 320 Mesh, manufactured or supplied by Harshaw Chemical Company, and Cumene Hydro-Peroxide Catalyst manufactured or supplied by Hercules Powder Company. The proportions of the resin, silica and catalyst may be as follows:

|  | Pounds |
|---|---|
| Silica | 7.5 |
| Resin | 5.5 |
| Peroxide Catalyst 200 drops per quart of mixture of the silica and resin. | |

After members 56 and 57 have been properly placed in the jig the space therebetween is filled with the plastic material. The rotor is then placed in an oven where it is heated to a temperature of between 240 degrees and 250 degrees Fahrenheit for two to two and one-half hours. The material upon cooling is so hard that a diamond drill is required in order to remove portions for purposes of dynamic balancing.

As seen in FIGS. 1 and 2 end covers 19 and 20 are provided with flange portions 60 and 61 respectively. Outer ring 33 of the stator is provided with openings 62 (FIG. 5) which may be aligned with similar openings in flanges 60 and 61. After assembly of the stator, rotor, and windings, the motor may be totally enclosed by end covers 19 and 20 which are secured as by bolts and nuts 63 which pass through both flange portions 60 and 61 and openings 62 in outer ring 33. Shaft 18 will be supported in bearing assemblies 21 and 22, as stated which may be of any appropriate conventional design commensurate with the intended use of motor 15.

It will be noted that rivets 45 and openings 62 are provided in outer ring 33 immediately adjacent shoulders 50. By this arrangement the flow of eddy currents in the stator, resulting from the changing magnetic field in the stator core, is not disturbed by the orientation of the rivets, screws or spokes. Consequently, a closed magnetic circuit is achieved wherein the magnetic strays are substantially non-existent. The motor is therefore particularly suited for tape recording devices, high fidelity or stereo record players and other applications where stray fields are objectionable.

Referring now to FIG. 9, the coils are shown wired for operation on single phase voltage. As shown, the coils of one phase (main) are separated from the coils of the other phase (auxiliary) by geometric angles of 45 degrees. In order that the windings may produce a rotating field, they are connected so that the flux will traverse the stator arms in the directions indicated by the vector arrows. When so connected, the flux produced by the main coils 24 and 26 will be radially inward and the flux produced by coils 25 and 27 will be radially outward while the supply voltage is plus, for example, and just the opposite when the voltage reverses to minus. The auxiliary windings 28, 29, 30 and 31 are similarly connected for like reasons to produce the directional flux relationships indicated by the vectors on these coils in FIG. 9.

The motor under consideration was designed for operation on 110–115 supply voltage. In such cases, the coils are preferably connected in series. At lower supply voltages, the coils may be connected in parallel or series-parallel, depending on the particular value of the supply voltage available and the impedance of the individual coil windings. Whichever mode of connection is employed, the capacitor for the auxiliary windings is so connected as to shift the phase of the auxiliary windings 90 degrees more or less whereby a synchronous rotating field is developed and synchronous operation of the motor obtained.

The connections for 115 volt operation of the motor may be as shown in FIG. 9. As there illustrated, the starting and finishing terminals of each coil are designated by the letters S and F as an aid to explaining the series connections of the coils of the two phases. In the main phase the starting terminal of coil 24 is connected to the voltage supply line L1. The finish terminal of coil 24 is connected to the finish terminal of coil 25; the starting terminal of coil 25 is connected to the starting terminal of coil 26; the finish terminal of coil 26 is connected to the finish terminal of coil 27, and the starting terminal of that coil is connected to supply line 22 of the voltage supply. The start and finish terminals of coils 28, 29, 30 and 31 are interconnected in the same manner. The starting terminal of coil 28 is connected to one side of capacitor C, the other side of the capacitor being connected to supply line L1. The starting terminal of coil 31 is connected to supply line L2.

It is important in small motors of this type, the capacitor capacity be as low as possible. When the motor horsepower output increases a higher capacitance is required at the moment of starting. For starting motors of higher output two capacitors C and C2 may be connected in parallel by a normally closed relay R of the solenoid type. This relay opens very quickly after the application of the supply voltage to open the circuit of capacitor C2 so that only capacitor C remains in the circuit for running the motor.

The motor which has been described supra is designed, as stated, for operation on single phase voltage supply, which requires the use of capacitor C in the auxiliary coil circuit. That motor may also be operated on a two-phase voltage supply by omitting the capacitor and connecting the coils of the main circuit winding across one phase of the two-phase supply and connecting the coils of the auxiliary circuit across the other phase. Where two-phase voltage is available the number of turns and the gauge of wire employed in the main circuit coils should preferably be the same as the number of turns and gauge of wire employed in the auxiliary circuit coils.

Figure 10:
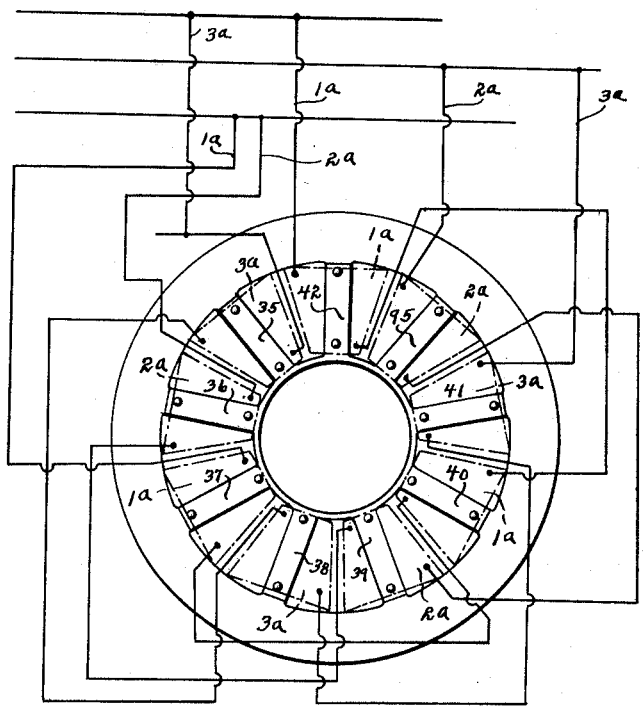
FIGURE 10 is a schematic plan view of a motor designed for operation on a three-phase voltage supply.

In FIG. 10 there is illustrated a motor embodying the invention which is designed for operation on a three-phase voltage supply. The motor of FIG. 10 would be constructed in the same manner as the motor of the other figures. The stator is formed from a pack of spider laminations having nine spokes or arms equally spaced and a pack of outer ring laminations either pressed or shrunk on the ends of the arms. A coil is provided on each arm. The coils identified by the numeral 1a are connected in series with each other, the finish terminal of one coil being connected to the finish terminal of the other. Similarly, the coils designated by the numeral 2a are also connected in series and form the second phase of the stator winding; the coils marked 3a comprise the coils of the third phase, the coils also being connected in series. The coils of the three phases 1a, 2a, and 3a are connected across a three-phase supply. The rotor of the motor of FIG. 10 operates at synchronous speed, the particular speed being equal to the frequency of the supply source divided by half the number of poles.

From the foregoing description it will be apparent to those skilled in this particular art that the stator spiders may be designed to have as many or as few spider spokes as desired depending upon the particular speed at which the rotor is to operate.

In my hysteresis motor stator design, the slots or openings provided in the interpole spaces in the central web increase the efficiency of the motor by increasing the flux density in the air gap between the rotor and the stator bore, and by decreasing the flux density in the web where the slots are located. The increase in air gap flux density increases the motor torque while the decrease in flux density in the web reduces the eddy current losses in the stator. In actual practice it has been found that the wattage required is reduced by 30 percent, the starting and running torque is increased by 20 percent, and the allowable air gap between the rotor and the stator bore is increased by from 2 to 3 times. Also, the capacity of the capacitor required for single phase operation is substantially reduced.

From tests, the width of each of the slits in the rotor (one of which is found between any two spoke arms) is most important and this is true regardless of the size of the motor. I find that the slit should not have a width greater than forty thousands of an inch or less than ten thousands of an inch. To go above or below these limitations is to reduce the motor's efficiency and/or produces undesirable noises. These noises are the result of flux density at the area and efficiency is impaired. If the slits are too narrow, the efficiency pull is too small and if the slits are too wide, the flux density is dispersed too much.

One important phase of this invention is the structure or outline of ring 33 and spider 34 at the time the ring 33 is severed from spider 34. It will be noted that when the spider 34 is cut from a ring 33, the cut line is not on the inside curvature edge of the ring, but is inwardly offset as shown in FIG. 5 to provide the shoulders 50. At each side of a shoulder 50 the two side edges thereof each extends from an inner edge of the shoulder forwardly and outwardly in a curved path. Thus, by these curved sides each shoulder becomes wider as it progresses toward the ring portion 33. By these curved side edges of the shoulders 50 there will be no substantial leakage of eddy currents, but instead the currents will blend between the ends of the shoulders and ring 33 proper. If these curved sides were not on the shoulders 50, the sharp angle of the sides of the shoulders as they approached the ring 33 would cause undesirable leakage of eddy currents.

From the foregoing it will be appreciated that I have provided a highly desirable synchronous motor. Its excellence over reluctance motors is obvious. In this connection it will be noted that there are two basic forms of synchronous motors which do not use D.-C. excitation. These are the reluctance and the hysteresis motors and these are preferred in fractional and subfractional motor sizes, because they do not require slip rings, brushes, or external power sources.

An additional objection to the D.-C. excited synchronous motor is that it has no inherent starting torque.

The reluctance motor is a simplified salient-pole synchronous motor without field windings. The synchronous torque is less than one-third that of the same motor with an externally excited field winding, but it is a simple and rugged device.

The stator and rotor magnetic structures of the reluctance motor generally consist of high-silicon steel laminations.

By means of grooves or cut outs on the periphery, the rotor is provided with saliencies equal in the number of poles of the rotating field of the stator.

This simple construction has many drawbacks and is used mostly in inexpensive motors.

The combination of low starting torque and the discontinuity of the rotor surfaces results in the characteristic "cogging" or "notching" behavior of the reluctance motor.

At start and at low speeds the torque fluctuates, and high-inertia or friction loads cannot be accelerated by the motor.

The hysteresis motor in contrast to performance of the reluctance motor is that the hysteresis motor exhibits substantially constant torque from stand still to synchronous speed.

Consequently there is no tendency to cog at low speed and a load which can be started by a hysteresis motor will be smoothly accelerated into synchronism.

Some changes may be made in the construction and arrangement of my synchronous motor without departing from the real spirit and purpose of my invention, and it is my intention to cover by my claims, any modified forms of structure or use of mechanical equivalents which may be reasonably included within their scope.

I claim:

1. A stator for an electric motor of the hysteresis type, said stator comprising, in combination:
   (a) a hollow cylinder having a wall thickness on the order of $\frac{1}{32}$ inch;
   (b) a plurality of evenly-spaced arms extending radially outward for equal distances from said cylinder;
   (c) an outer ring encircling and engaging the outer ends of said arms;
   (d) a continuous web to which said arms are joined at their inner ends; said web having a center bore;
   (e) said web having a slot opening between each two arms with the slot opening having a width substantially forty thousandths of an inch; said slot opening extending in a direction parallel to the longitudinal axis of said bore.

2. The device of claim 1 wherein said ring has a plurality of internal shoulders, each of which are in pressure engagement with one of the outer ends of said arms; each of said shoulders having sides that curve outwardly and tangentially toward the inside curvature of said ring proper.

References Cited in the file of this patent

UNITED STATES PATENTS

| | | |
|---|---|---|
| 2,172,191 | Denman | Sept. 5, 1939 |
| 2,547,599 | Roters | Apr. 3, 1951 |
| 2,711,008 | Smith | June 21, 1955 |
| 2,804,680 | Flagg | Sept. 3, 1957 |
| 2,981,856 | Ludemann et al. | Apr. 25, 1961 |